Patented Nov. 6, 1945

2,388,372

UNITED STATES PATENT OFFICE 2,388,372

CATALYSTS FOR THE ADDITION POLYMERIZATION OF UNSATURATED ORGANIC COMPOUNDS

William D. Stewart, Akron, Ohio, assignor to The B. F. Goodrich Company, New York, N. Y., a corporation of New York No Drawing. Application April 15, 1942,
Serial No. 439,101

14 Claims. (Cl. 260—84.5)

This invention relates to the polymerization of unsaturated organic compounds which are capable of undergoing an addition polymerization to form high molecular weight linear polymers and particularly to the polymerization in aqueous emulsion of a butadiene-1,3 either alone or in admixture with a monomer copolymerizable therewith. The principal object of the invention is to provide a new class of catalysts or accelerators for such polymerizations by the use of which improved polymers are obtained in increased yield and in a much shorter interval of time.

I have discovered that the time required to effect addition polymerization reactions can be greatly reduced by the use of heavy metal catalysts and that the polymers produced when employing such catalysts exhibit excellent properties despite the short periods of time required for the completion of the polymerization. Certain of these heavy metal catalysts, called redox systems because of their property of catalyzing biological oxidation-reduction reactions, are disclosed in my copending applications Serial Nos. 379,712 to 379,717 inclusive, filed February 19, 1941.

This application is a continuation-in-part of my copending application Serial No. 379,714 and relates to the class of heavy metal catalysts derived from a heavy metal compound and an aliphatic carboxylic acid containing at least one carboxyl group and in addition at least one primary amino group in the alpha position with respect to a carboxyl group and no additional types of substituents other than hydroxy groups. Such amino acids will, in general possess the formula

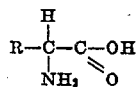

wherein R represents hydrogen, a hydrocarbon radical or a hydroxy, carboxy or amino substituted hydrocarbon radical. Typical amino acids included in this class are glycine (amino-acetic acid), alanine (alpha-amino-propionic acid), serine (alpha - amino - beta - hydroxy - propionic acid), threonine (alpha-amino-beta-hydroxy-butyric acid), valine (alpha-amino-isovaleric acid), leucine (alpha-amino-isocaproic acid), nor-leucine (alpha - amino - caproic acid), isoleucine (alpha-amino-beta-methyl-beta-ethyl - propionic acid), aspartic acid (alpha-amino-beta-carboxy-propionic acid or amino-succinic acid), glutamic acid (alpha-amino-gamma-carboxy butyric acid or alpha-amino glutaric acid), lysine (alpha-epsilon-diamino caproic acid) and the like.

The term "heavy metal" is used herein to signify metals which have a density greater than four, an atomic weight greater than forty and a low atomic volume (ratio of atomic weight to density) and consequently appear substantially at or near the minimum points above an atomic weight of forty on Lothar Meyer's atomic volume curve. (See any standard textbook of Inorganic Chemistry such as Ephraim's "Textbook of Inorganic Chemistry" page 30 or Caven and Lander's "Systematic Inorganic Chemistry" facing page 30.) The term "heavy metal" includes therefore the metallic elements appearing in the center positions of the long periods of a periodic table arranged in long and short periods, and especially those occurring in the 6th to 12th positions of the long periods (considering the alkali metals to occupy the first position and all the rare earth metals to occupy a single position), that is, the elements occurring in group VIII of the Mendeléef Periodic Table such as iron, cobalt and nickel, those in subgroup B of groups I and II of the Mendeléef Periodic Table such as copper, zinc and mercury and those in subgroup A of groups VI and VII of the Mendeléef Periodic Table such as chromium, manganese and molybdenum.

The heavy metal catalysts of this invention are derived from a heavy metal compound and an amino acid of the type described, and may consist of complex compounds containing a heavy metal atom united to one or more amino acid residues at least in part by coordinated covalences rather than primary valences as in the complex compound copper glycine which is believed to have the structure

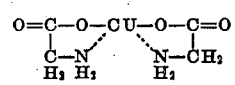

The heavy metal catalysts may also consist however of simple heavy metal salts of amino acids or of mixtures of heavy metal salts and amino acids or amino acid salts. In the latter event, the heavy metal salts may combine chemically with the amino acids to form complex compounds of the type described above, but it is to be understood that all catalysts obtained by the combination of heavy metal compounds and amino acids of the type described are included in this invention regardless of whether or not known chemical complexes are formed. The preferred catalysts are obtained from salts of those heavy metals which are known to occur in living cells, particularly those occurring in the 6th to 12th positions (i. e., in group VIII, I-B, II-B, VI-A, and VII-A) of the first long period of the periodic table, and from amino acids or hydroxy substituted amino acids containing less than eight carbon atoms, examples of such preferred catalysts being formed from mixtures of simple salts of iron, cobalt, nickel, zinc and copper with glycine, alanine and serine. Since the polymerization reactions catalyzed by the method of this invention are preferably carried out in aqueous emulsion it is also highly desirable that the catalysts be water soluble, by which is meant that the whole catalytic system will dissolve in the amount of water present in the emulsion. The preferred catalytic combinations mentioned above are readily soluble in water when the heavy metal salt employed is a nitrate, chloride, sulfate or other water soluble salt and when the amino acid is employed as such or as an alkali metal salt.

In the practice of this invention addition polymerizations of unsaturated organic compounds to form high molecular weight linear polymers are preferably carried out in aqueous emulsion in the presence of the above-described heavy metal catalysts although other methods of polymerization such as polymerization in homogeneous systems may also be employed. In the emulsion polymerization process, the unsaturated compounds, or monomers, to be polymerized are emulsified in water with the aid of an emulsifying agent and polymerization is then effected by adding a heavy metal catalyst described above, together, if desired, with various other substances, the nature of which will be described hereinafter, and then agitating the emulsion until polymer is formed. The resulting polymerized emulsion containing polymer particles dispersed in water greatly resembles natural rubber latex and may be coagulated in the usual manner to yield the solid polymer.

The amount of the catalyst to be used in the polymerization may be varied over rather wide limits depending upon the particular catalyst used and the particular compounds polymerized but, in general, only very small or catalytic amounts are employed and it is preferable that no more than about 2% by weight, based on the weight of the monomers, of the whole catalytic system, including both the heavy metal compound and the amino acid, if a mixture of these is employed as the catalyst, be used. When the catalyst consists of a complex compound, containing a heavy metal atom united to one or more amino acid molecules, added as such, or of a heavy metal salt of an amino acid added as such, amounts of 0.1 to 1% of the catalyst are preferred. When, however, the catalyst is added as a mixture of a heavy metal salt and an amino acid, amounts of 0.01 to 0.1% of the heavy metal salt and 0.2 to 1.5% of the amino acid give best results. Although ionizable heavy metal salts, particularly those of copper and manganese, when present in polymerization batches not containing a compound which forms a complex therewith, often inhibit polymerizations unless their concentration is less than 0.1%, the catalysts of this invention do not possess this disadvantage since the presence of the amino acid converts the heavy metal ions into complexes in which the heavy metal atoms are present in a substantially un-ionized form.

As has been mentioned hereinabove the heavy metal catalysts of this invention may be used generally in the polymerization of those unsaturated organic compounds which undergo addition polymerizations to form high molecular weight linear polymers by which is meant that a large number of monomer molecules add onto one another to form a large molecule having a predominantly linear structure. Unsaturated organic compounds which undergo such polymerizations generally contain the characteristic structure

and, in most cases, have at least one of the disconnected valencies attached to an electronegative group, that is, a group which increases the polar character of the molecule such as a chlorine group or an organic group containing a double or triple bond such as vinyl, phenyl, nitrile, carboxy or the like. Included in this class of monomers are the conjugated butadienes or butadienes-1,3 such as butadiene (butadiene-1,3), 2,3-dimethyl butadiene-1,3, isoprene, chloroprene, piperylene, 3-furyl butadiene-1,3, 3-methoxy butadiene-1,3 and the like; aryl olefins such as styrene, p-chloro styrene, p-methoxy styrene, alpha-methyl styrene, vinyl naphthalene and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinyl furane, vinyl carbazole, isobutylene, vinyl acetylene and other unsaturated hydrocarbons, esters, alcohols, acids, ethers, etc., of the type described. Such unsaturated compounds may be polymerized alone, in which case simple linear polymers are formed, or mixtures of two or more of such compounds which are copolymerizable with each other may be polymerized to form linear copolymers.

The catalysts of this invention are particularly effective when the monomeric material polymerized is a conjugated butadiene or a mixture of a conjugated butadiene with lesser amounts of one or more other compounds containing a

group which are copolymerizable therewith such as aryl olefins, acrylic and substituted acrylic acids, esters, nitriles and amides, methyl isopropenyl ketone, vinylidene chloride and similar compounds mentioned hereinabove. In this case the products of the polymerization are high molecular weight linear polymers and copolymers which are rubbery in character and may be called synthetic rubber. The polymerization of other monomers and monomer mixtures of the type described to form linear polymers of a resinous character is also improved, however, by the catalysts of this invention.

As emulsifying agents which may be employed in emulsion polymerizations may be mentioned soaps such as sodium oleate, potassium palmitate and sodium myristate, synthetic saponaceous materials including hymolal sulfates and alkaryl sulfonates such as sodium lauryl sulfate and sodium isopropyl naphthalene sulfonate, and salts of organic bases containing long carbon chains such as trimethyl-cetyl-ammonium methyl sulfate, the hydrochloride of oleylamidoethyl dimethylamine, the hydrochloride of diethylaminoethyl-oleyl-amide and the like. The soaps are employed in polymerizations under basic conditions, the salts of organic bases under acid conditions and the synthetic saponaceous materials under acid, alkaline or neutral conditions.

Polymerization initiators which are preferably, although not necessarily, employed in the polymerization batch together with the heavy metal catalysts of this invention include per-compounds such as hydrogen peroxide, benzoyl peroxide, potassium persulfate, sodium perborate, potassium percarbonate and the like as well as other types of initiators such as diazoaminobenzene, sulfur dioxide, dipotassium diazomethane disulfonate and triphenylmethylazobenzene. The per-compounds, particularly hydrogen peroxide when used with a fatty acid soap as the emulsifying agent, give especially good results in the emulsion polymerization of conjugated butadienes in the presence of combinations of heavy metal salts and amino acids as catalysts.

It is also desirable in the emulsion polymerization of conjugated butadienes to form synthetic rubber, to employ a polymerization modifier which increases the plasticity and solubility of the rubber polymers produced. Compounds suitable for this purpose include sulfur-containing compounds such as dialkyl dixanthogens, the higher tetraalkyl mono and polysulfides, mercaptoalkyl thiazoles and the like.

The preferred manners of practicing this invention and the improved results obtained thereby may be shown by the following specific examples which are intended to illustrate rather than limit the invention. The parts are by weight.

*Example I*

A mixture of 55 parts of butadiene and 45 parts of acrylonitrile is emulsified in 250 parts of a 2% aqueous solution of myristic acid which is 85% converted into soap by neutralization with sodium hydroxide. 10 parts of a 3½% solution of hydrogen peroxide, 0.3 part of a polymerization modifier, di-isopropyl dixanthogen, and a heavy metal catalyst consisting of a mixture of 0.01 part of cuprous chloride and 0.50 part of glycine are added to the emulsion and the emulsion is agitated at 30° C. until polymer is formed. The polymerization is completed in 23 hours to yield 94 parts of a rubbery copolymer of butadiene and acrylonitrile. A similar polymerization in which no heavy metal catalyst is employed requires 45 hours for completion and is only 45% complete after 23 hours and another similar polymerization employing cuprous chloride, but no glycine, has not started after 45 hours. The solubility and plasticity of the rubbery copolymer prepared in the presence of the copper-glycine catalyst is equal to that of the polymer prepared in the absence of the catalyst, and the vulcanizates obtained from the polymers prepared in the presence of the catalyst possess higher tensile strengths and ultimate elongations than similar vulcanizates from the polymers prepared in the absence of the catalyst.

*Example II*

A mixture of 13 parts by weight of butadiene and 7 parts by weight of acrylonitrile is agitated at 30° C. in an aqueous emulsion containing 20 parts of a 2% aqueous solution of sodium lauryl sulfate as an emulsifying agent, 0.7 part of hydrogen peroxide as an initiator, .06 part of di-isopropyl dixanthogen as a modifier, and a heavy metal catalyst comprising .005 part of cobaltous chloride and 0.2 part of glycine. Polymerization is completed after about 66 hours and a concentrated latex containing about 16 parts of a rubbery copolymer of butadiene and acrylonitrile dispersed in only about 20 parts of water is obtained. The preparation of such concentrated latices in the absence of heavy metal catalysts requires very long reaction times and is sometimes impossible. The concentrated latex obtained may be dried to yield exceedingly tough, oil-resistant, synthetic rubber films or it may be coagulated to yield a plastic, oil resistant synthetic rubber. The synthetic rubber obtained by the latter procedure may be compounded and vulcanized to yield especially strong resistant vulcanizates having tensile strengths of well over 5000 lbs./sq. in. and ultimate elongations over 900%.

*Example III*

An emulsion of a mixture of butadiene and acrylonitrile is prepared as in Example I, except that the heavy metal catalyst consists of a mixture of 0.03 part of iron sulfate, 0.01 part of cobaltous chloride and 0.25 part of serine, and is polymerized in 20 hours at 30° C. The product is a synthetic latex which may be coagulated in the usual way to yield a plastic, coherent, oil resistant synthetic rubber. It was also observed that the product obtained in this example possessed considerably more tack, and better milling characteristics on a hot mill than is ordinarily found in butadiene acrylonitrile copolymers.

*Example IV*

Example III is repeated using alanine as the amino acid in place of serine. In this example the polymerization requires 26 hours to produce a 90% yield of a similar rubbery butadiene acrylonitrile copolymer. The times required to effect the polymerization in this and the preceding example are to be compared with a time of 45 hours to complete the polymerization when no heavy metal catalyst is employed, thus again showing the remarkable accelerating effect of the catalysts of this invention on the polymerization.

*Example V*

The procedure of Example III is again repeated using as the heavy metal catalyst a mixture of .03 part of iron sulfate, .01 part of cobalt chloride and 0.25 part of glutamic acid. The polymerization requires only 14 hours to produce a 91% yield of a synthetic rubber similar to that obtained in Example III.

*Example VI*

An emulsion containing the following ingredients is prepared:

| | Parts |
|---|---|
| Butadiene | 70 |
| Styrene | 30 |
| Sodium myristate (2% aqueous solution) | 250 |
| Hydrogen peroxide | .35 |
| Di-isopropyl dixanthogen | .45 |
| Ferrous ammonium sulfate | .05 |
| Serine | .50 |

The emulsion is then agitated at 30° C. for 20 hours whereupon a synthetic latex is obtained which, when coagulated, produces a 99% yield of a rubbery copolymer. The copolymer is plastic and easily milled and may be compounded and vulcanized to form strong elastic vulcanizates. When a similar emulsion is polymerized without the addition of ferrous ammonium sulfate and serine over 150 hours is required to complete the polymerization and when ferrous ammonium sulfate alone is used the polymerization is only 70% completed in 87 hours.

When this example is repeated using methyl acrylate, methyl methacrylate, methyl isopropenyl ketone, vinylidene chloride and other monomers in place of styrene similar synthetic rubbers are obtained in good yields in about the same length of time. The proportions of the monomers polymerized may also be varied without appreciably affecting the length of time required for the polymerization. For example a monomer mixture consisting of 90 parts of styrene and 10 parts of butadiene may be polymerized in this same manner in about 25 hours to produce a strong, flexible, thermoplastic synthetic resin. Other thermoplastic resins may be obtained by using styrene, methyl methacrylate, vinyl chloride or the like alone or in admixture with each other as the polymerizable material.

Other embodiments of the invention in which various other heavy metal catalysts are used with various monomer mixtures, initiators and emulsifying agents also demonstrate that the polymerization velocity is remarkably increased by the practice of this invention.

The use of the heavy metal catalysts of this invention is particularly important in the commercial manufacture of polymers since the great accelerating effect of these catalysts more than counteracts the inhibiting effect of other substances which may be present during the polymerization. Many such inhibiting substances are quite difficult to exclude from the polymerization batch because they may be present as impurities in the monomers or in other essential materials. Moreover other substances which it is highly desirable to include in the polymerization recipe, such as certain polymerization modifiers, also often retard the speed of the polymerization but when used with heavy metal catalysts the polymerization takes place in a convenient interval of time.

Other methods and procedure known to be useful in connection with the polymerization of unsaturated organic compounds are within the spirit and scope of the invention as defined in the appended claims.

I claim:

1. The method which comprises subjecting a monomeric material comprising a conjugated butadiene, to polymerization in aqueous emulsion in the presence of a heavy metal catalyst obtained by the combination of a water-soluble heavy metal salt and a saturated aliphatic carboxylic acid selected from the class consisting of saturated aliphatic carboxylic acids having a primary amino group in alpha position to a carboxyl group and being composed, in addition to primary amino and carboxyl, of saturated aliphatic structure made up exclusively of atoms of carbon, hydrogen and oxygen, all oxygen being present in hydroxy, and saturated aliphatic carboxylic acids having a primary amino group in alpha position to a carboxyl group and being composed, in addition to primary amino and carboxyl of saturated aliphatic structure made up exclusively of atoms of carbon and hydrogen.

2. The method which comprises subjecting a monomeric mixture of a conjugated butadiene and another compound which contains a

group and is copolymerizable therewith in aqueous emulsion, to polymerization in aqueous emulsion in the presence of a water soluble salt of a heavy metal occurring in group VIII and the first long period of the periodic table, and a saturated aliphatic carboxylic acid having a primary amino group in alpha position to a carboxyl group and being composed, in addition to primary amino and carboxyl, of saturated aliphatic structure in which there is present, in addition to hydrocarbon structure, no structure other than hydroxy.

3. The method which comprises polymerizing butadiene in aqueous emulsion in the presence of a heavy metal catalyst obtained by the combination of a water soluble heavy metal salt and a saturated aliphatic monocarboxylic acid containing a primary amino group attached to the same carbon atom to which is attached the carboxyl group and being otherwise composed, in addition to the primary amino group and the carboxyl group, of saturated aliphatic structure in which there is present, in addition to hydrocarbon structure, no structure other than hydroxy.

4. The method which comprises subjecting a monomeric mixture of butadiene and a compound which contains

group and is copolymerizable therewith in aqueous emulsion, to polymerization in aqueous emulsion in the presence of a water soluble salt of a heavy metal occurring in group VIII and the first long period of the periodic table, and a saturated aliphatic monocarboxylic acid containing less than eight carbon atoms, the said acid having a primary amino group attached to the same carbon atom to which is attached the carboxyl group and being otherwise composed, in addition to the primary amino group and the carboxyl group, of saturated aliphatic structure in which there is present, in addition to hydrocarbon structure, no structure other than hydroxy.

5. The method which comprises subjecting a monomeric mixture of butadiene and a compound which contains a

group and is copolymerizable therewith in aqueous emulsion, to polymerization in aqueous emulsion in the presence of a water soluble salt of a heavy metal occurring in group VIII and the first long period of the periodic table, and a saturated aliphatic monocarboxylic acid containing less than eight carbon atoms, the said acid having a primary amino group attached to the same carbon atom to which is attached the carboxyl group and being otherwise composed, in addition to the primary amino group and the carboxyl group, exclusively of saturated aliphatic hydrocarbon structure.

6. The method of claim 5 wherein the monomeric mixture polymerized consists of butadiene and acrylonitrile.

7. The method which comprises polymerizing a mixture of butadiene and acrylonitrile in aqueous emulsion in the presence of a water soluble iron salt and alanine.

8. The method which comprises subjecting a monomeric mixture of butadiene and a compound which contains a

group and is copolymerizable therewith in aqueous emulsion, to polymerization in aqueous emulsion in the presence of a water soluble salt of a heavy metal occurring in group VIII and the first long period of the periodic table, and a saturated aliphatic monocarboxylic acid containing less than eight carbon atoms, the said acid having a primary amino group attached to the same carbon atom to which is attached its carboxyl group, a hydroxy group attached to another carbon atom and being otherwise composed, in addition to the carboxyl group, the primary amino group and the hydroxy group, exclusively of saturated aliphatic hydrocarbon structure.

9. The method of claim 8 wherein the monomeric mixture polymerized consists of butadiene and styrene.

10. The method which comprises subjecting a mixture of butadiene and a compound containing a

group which is copolymerizable therewith in aqueous emulsion to polymerization in aqueous emulsion in the presence of a water soluble salt of a group VIII heavy metal and serine.

11. The method which comprises polymerizing a mixture of butadiene and styrene in aqueous emulsion in the presence of a water soluble cobalt salt and serine.

12. The method which comprises polymerizing a conjugated butadiene in aqueous emulsion in the presence of a heavy metal catalyst comprising the complex compound copper glycine.

13. The method which comprises polymerizing a conjugated butadiene in aqueous emulsion in the presence of a water soluble complex compound of a heavy metal occurring in the 6th to 12th positions of the first long period of the periodic table and a saturated aliphatic monocarboxylic acid containing a primary amino group in alpha position to its carboxyl group and being otherwise composed, in addition to the primary amino group and the carboxyl group, of saturated aliphatic structure in which there is present, in addition to hydrocarbon structure, no structure other than hydroxy.

14. The method which comprises polymerizing butadiene in aqueous emulsion in the presence of hydrogen peroxide, a fatty acid soap, and a heavy metal catalyst obtained by the combination of a water soluble salt of a heavy metal occurring in group VIII and the first long period of the periodic table and a saturated aliphatic carboxylic acid having a primary amino group in alpha position to a carboxyl group, and being composed in addition to primary amino and carboxyl, of saturated aliphatic structure in which there is present, in addition to hydrocarbon structure, no structure other than hydroxy.

WILLIAM D. STEWART.